United States Patent
Miyazawa et al.

(10) Patent No.: US 9,815,735 B2
(45) Date of Patent: Nov. 14, 2017

(54) LEAD-FREE GLASS AND SEALING MATERIAL

(71) Applicant: Central Glass Company, Limited, Ube-shi, Yamaguchi (JP)

(72) Inventors: Masamichi Miyazawa, Matsusaka (JP); Jun Hamada, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 14/906,800

(22) PCT Filed: Aug. 14, 2014

(86) PCT No.: PCT/JP2014/071421
§ 371 (c)(1),
(2) Date: Jan. 21, 2016

(87) PCT Pub. No.: WO2015/029792
PCT Pub. Date: Mar. 5, 2015

(65) Prior Publication Data
US 2016/0168017 A1    Jun. 16, 2016

(30) Foreign Application Priority Data

Aug. 29, 2013 (JP) ................... 2013-177580
Aug. 5, 2014 (JP) ................... 2014-159540

(51) Int. Cl.
C03C 8/24 (2006.01)
C03C 3/12 (2006.01)
C03C 8/04 (2006.01)

(52) U.S. Cl.
CPC ............... *C03C 8/24* (2013.01); *C03C 3/122* (2013.01); *C03C 8/04* (2013.01)

(58) Field of Classification Search
CPC ..................... C03C 8/04; C03C 8/24
See application file for complete search history.

(56) References Cited

U.S. PATENT DOCUMENTS

| | | | | |
|---|---|---|---|---|
| 7,871,949 B2 * | 1/2011 | Lee | .......... | C03C 8/02 428/410 |
| 8,022,000 B2 * | 9/2011 | Sawai | ........ | H01J 5/20 501/14 |
| 8,333,833 B2 * | 12/2012 | Sugiura | .......... | C01B 25/372 106/286.2 |
| 8,546,281 B2 * | 10/2013 | Lee | ........... | C03C 8/02 257/88 |
| 8,766,524 B2 * | 7/2014 | Kohara | ....... | C03C 8/04 313/480 |
| 2005/0134150 A1 | 6/2005 | Kikushima et al. | | |
| 2005/0233885 A1 | 10/2005 | Yoshida et al. | | |
| 2007/0158021 A1 | 7/2007 | Sawai et al. | | |
| 2012/0058877 A1 * | 3/2012 | Sugiura | .......... | C01B 25/372 501/32 |
| 2012/0321902 A1 | 12/2012 | Kohara et al. | | |

FOREIGN PATENT DOCUMENTS

| CN | 102775067 A | 11/2012 |
|---|---|---|
| JP | 11-312948 A | 11/1999 |
| JP | 2004-250276 A | 9/2004 |
| JP | 2004250276 * | 9/2004 |
| JP | 2007-182347 A | 7/2007 |
| JP | 2010-52990 A | 3/2010 |
| JP | 2011-79694 A | 4/2011 |
| JP | 2011079694 * | 4/2011 |
| JP | 2012-106891 A | 6/2012 |
| JP | 2013-155059 A | 8/2013 |
| WO | WO 2011/108115 A1 | 9/2011 |

OTHER PUBLICATIONS

International Search Report (PCT/ISA/210) issued in PCT Application No. PCT/JP2014/071421 dated Sep. 30, 2014 with English translation (five pages).

Kouhara et al., "Application of Lead-Free Vanadium Sealing Glasses to the Flat Fluorescence Lump", Mar. 20, 2008, pp. 287-290, vol. 34, No. 2, Department of Applied Chemistry and Chemical Engineering et al., Kagoshima-shi, Kagoshima, Japan, with English abstract (seven pages).

Extended European Search Report issued in counterpart European Application No. 14840103.7 dated Feb. 13, 2017 (twelve (12) pages).

T. Isobe, Y. Kato, M. Mizutani, T. Ota, K. Daimon: "Pressureless sintering of negative thermal expansion ZrW2O8/Zr2WP2O12 composites", Materials Letters, vol. 62, No. 24, 2008, pp. 3913-3915, XP002766615 (three (3) pages).

Japanese-language Written Opinion (PCT/ISA/237) issued in PCT Application No. PCT/JP2014/071421 dated Sep. 30, 2014 with English translations (16 pages).

Taiwanese Office Action issued in counterpart Taiwanese Application No. 1042143699001 dated Oct. 23, 2015 with English translations (14 pages).

* cited by examiner

*Primary Examiner* — Karl Group
(74) *Attorney, Agent, or Firm* — Crowell & Moring LLP

(57) ABSTRACT

Disclosed is a lead-free glass, which is characterized by comprising 5-55 weight % of $V_2O_5$, 5-75 weight % of $TeO_2$, 6-20 weight % of a total of RO (at least one selected from the group consisting of MgO, CaO, SrO and BaO) and 0.1-6 weight % of ZnO in a glass component, $V_2O_5+TeO_2+RO+ZnO$ being 70 weight % or greater. From this lead-free glass, a sealing material having fluidity which is capable of sealing at 400° C. or lower can be obtained.

10 Claims, No Drawings

LEAD-FREE GLASS AND SEALING MATERIAL

TECHNICAL FIELD

The present invention relates to a sealing material using a lead-free glass.

BACKGROUND OF THE INVENTION

Various solders and glasses have been used as an adhesive material and a sealing material of electronic components until now. In particular, gold-tin solder and lead glass have been used because there is a case where heat-resistance of parts of a semiconductor package, a crystal unit, a MEMS, etc. is low that is approximately 400° C. Materials used for these are required, according to their use, to have various characteristics, such as chemical durability, mechanical strength, fluidity, etc. In particular, in case of using them as the sealing material, fluidity at a low temperature is mentioned as an important factor.

In case that the above-mentioned fluidity is insufficient, it is not possible to obtain the characteristics required in each electronic component because there is a risk of leaking out from a sealed part. Therefore, gold-tin solder and lead glass showing a sufficient fluidity at 400° C. or lower have been used. In Patent Publication 1, the gold-tin solder is used for manufacturing a piezoelectric vibrator incorporating a crystal unit, and sealing at 250° C. to 500° C. is disclosed. On the other hand, gold-tin solder is high-priced and lead glass contains a large amount of PbO which has a heavy burden on a human body and on the environment. Therefore, an alternative material has been required.

As the above alternative material, for example, Patent Publication 2 proposes a $V_2O_5$—$TeO_2$ glass and discloses that sealing is possible at a low temperature. In addition, Patent Publication 3 proposes $V_2O_5$—$TeO_2$—$WO_3$—$P_2O_5$ and $V_2O_5$—$TeO_2$—$WO_3$—$ZnO$ glasses. On the other hand, these glasses show low softening points, however, there is a case of lacking fluidity as an important factor for sealing performance.

PRIOR ART REFERENCES

Patent Publications

Patent Publication 1: Japanese Patent Application Publication H11-312948
Patent Publication 2: Japanese Patent Application Publication 2004-250276
Patent Publication 3: Japanese Patent Application Publication 2012-106891

SUMMARY OF THE INVENTION

As mentioned above, a sealing material which is capable of sealing at 400° C. or lower has been required. However, gold-tin solder is high-priced, and a glass containing lead affects the environment. Therefore, in recent years, there is a tendency to avoid using them. In addition, the above-mentioned alternative materials have been proposed. However, there has been a problem such as an insufficient fluidity which is important for sealing.

Therefore, it is an object of the present invention to obtain a sealing material having fluidity, which is capable of sealing at 400° C. or lower.

Therefore, the present invention is a lead-free glass, which is characterized by comprising 5-55 weight % of $V_2O_5$, 5-75 weight % of $TeO_2$, 6-20 weight % of a total of RO (at least one selected from the group consisting of MgO, CaO, SrO and BaO) and 0.1-6 weight % of ZnO in a glass component, $V_2O_5$+$TeO_2$+RO+ZnO being 70 weight % or greater.

In the present invention, "lead-free" means that lead is substantially not contained in the glass component. For example, the content of PbO is less than 0.3 weight %.

The lead-free glass of the present invention has an excellent fluidity at low temperatures and it can be preferably used as a sealing material. In addition, in the present description, "low temperatures" refer to 400° C. or lower.

In addition, the above-mentioned fluidity was measured in the after-mentioned Examples. In the present description, the sample was heated at 350° C. or 380° C. for 10 minutes and cooled down to ordinary temperature. After this, the diameter of the sample was measured. When the measured diameter was enlarged 10% or greater, as compared with that of the sample before heating, the fluidity was judged as being excellent.

Effects of the Invention

According to the present invention, it has become possible to obtain a sealing material having fluidity, which is capable of sealing at 400° C. or lower.

DETAILED DESCRIPTION

The present invention is a lead-free glass, which is characterized by comprising 5-55 weight % of $V_2O_5$, 5-75 weight % of $TeO_2$, 6-20 weight % of a total of RO (at least one selected from the group consisting of MgO, CaO, SrO and BaO) and 0.1-6 weight % of ZnO in a glass component, $V_2O_5$+$TeO_2$+RO+ZnO being 70 weight % or greater.

In case of sealing by using glass, in general, the glass is made into a powder shape, and the glass powder is applied at a predetermined position. After this, it is baked by heating. In addition, "lead-free glass" of the present invention includes the glass powder and a state after baking it.

In the following, the lead-free glass of the present invention is explained.

$V_2O_5$ has an effect of lowering softening point of the glass. It is contained in the glass in a range of 5-55 weight %. If it exceeds 55 weight %, vitrification becomes difficult, and even if it is vitrified, fluidity becomes low due to the tendency to devitrification. If $V_2O_5$ is less than 5 weight %, the softening point increases, therefore, it is not suitable for the present invention. Preferably, the lower limit can be 24 weight % or greater. More preferably, it can be 36 weight % or greater. In addition, preferably, the upper limit can be 48 weight % or less.

$TeO_2$ has an effect of increasing fluidity of the glass. It is contained in the glass in a range of 5-75 weight %. If it exceeds 75 weight %, the softening point increases. Therefore, it is not suitable for the present invention. Moreover, devitrification tends to occur, and sealing performance becomes low. If $TeO_2$ is less than 5 weight %, it is difficult to vitrify, and devitrification tends to occur even if it is vitrified. Therefore, fluidization becomes difficult. Preferably, the lower limit can be 31 weight % or greater. More preferably, it can be 40 weight % or greater. In addition, preferably, the upper limit can be 70 weight % or less. More preferably, it can be 59 weight % or less.

In general, glasses having low softening points are low in stability, and crystallization tends to occur at the time of baking. Stability of a $V_2O_5$—$TeO_2$ glass tends to be roughly decided by the ratio of the content of $TeO_2$ to $V_2O_5$. Therefore, in the present invention, it is preferable that $TeO_2/V_2O_5$ is 0.7-10.

RO has an effect to thermally stabilize the glass and has a role to adjust linear expansion coefficient. It is contained in a range of 6-20 weight % in total in the glass. If it is less than 6 weight % or exceeds 20 weight %, the above effects may not be shown depending on the relations with other components. It is preferable to use BaO as RO component used. In addition, it is possible by combining two or more components and using them to reduce the linear expansion coefficient. Thus, it is preferable. Preferably, the lower limit can be 6 weight % or greater. Moreover, preferably, the upper limit can be 16.9 weight % or less.

ZnO has effects of lowering the softening point and reducing thermal expansion coefficient of the glass. It is contained in a range of 0.1-6 weight % in the glass. In case that the content of ZnO exceeds 6 weight %, stability of the glass lowers and the fluidity at the time of softening decreases by crystallization. In addition, in case of becoming less than 0.1 weight %, it is not possible to obtain the above effects. Preferably, the lower limit can be 1 weight % or greater. More preferably, it can be 2 weight % or greater. Moreover, preferably, the upper limit can be 5 weight % or less. More preferably, it can be 4 weight % or less.

The above four components that are $V_2O_5$, $TeO_2$, BaO and ZnO are essential components. $V_2O_5+TeO_2+RO+ZnO$ is set at 70 weight % or greater. Preferably, it can be 85 weight % or greater. In addition, it can be 100 weight % to obtain a sealing material having an excellent fluidity and a low softening point.

In addition, optional components, such as $Li_2O$, $Na_2O$, $K_2O$, $Al_2O_3$, $Fe_2O_3$, NiO, CuO, CoO and $ZrO_2$, can be added to the above-mentioned four essential components.

Among the above optional components, it is optional to suitably add $R_2O$ ($Li_2O$, $Na_2O$, $K_2O$), which is represented in the form of a common oxide, to lower the softening point, give fluidity to the glass and adjust the linear expansion coefficient, to the extent that the above properties are not impaired.

In addition, $Al_2O_3$, $Fe_2O_3$, NiO, CuO, CoO, $ZrO_2$, etc. may be suitably added to suppress the devitrification and adjust the linear expansion coefficient, to the extent that the above properties are not impaired. Moreover, it is preferable to contain 0.1-10 weight % of the total of at least one selected from the group consisting of $Fe_2O_3$, NiO, $Al_2O_3$ and CoO, which are especially effective in suppressing the crystallization. Furthermore, $V_2O_5+TeO_2+RO+ZnO+R_2O+Fe_2O_3+NiO+Al_2O_3+CoO+ZrO_2$ selected from the above-mentioned essential components and preferable optional components can be 100 weight %.

In addition, in the lead-free glass of the present invention, it is preferable that phosphoric acid is not substantially contained in the glass component. If phosphoric acid is contained, there are possibilities that moisture resistance and the fluidity become low. "Phosphoric acid is not substantially contained" means that the content of $P_2O_5$ can be less than 1 weight %. Moreover, preferably, it can be less than 0.3 weight %.

In general, when sealing is performed by using a glass powder, the sealing is performed at a temperature of softening point of the glass or higher, more preferably at a temperature of softening point plus 20° C. or more. As mentioned above, it is an object of the present invention to be able to seal at 400° C. or lower. Therefore, it is preferable that the softening point is 380° C. or lower. In addition, more preferably, it can be 350° C. or lower. If the softening point exceeds 380° C., sealing at low temperatures tends to be difficult. Moreover, the lower limit is not particularly limited. However, for example, it can be 250° C. or higher.

In the lead-free glass of the present invention, it is preferable that the linear expansion coefficient in 30° C.-250° C. is $100\text{-}180\times10^{-7}$/K. If the softening point is high, the linear expansion coefficient tends to increase. If the linear expansion coefficient is less than $100\times10^{-7}$/K, there is a case that the softening point exceeds 400° C. If the linear expansion coefficient exceeds $180\times10^{-7}$/K, there is a case that the linear expansion coefficient becomes too high depending on the use.

In addition, it becomes possible by containing an inorganic filler in the lead-free glass of the present invention to reduce the above linear expansion coefficient while keeping low softening points. That is, one of preferable embodiments of the present invention is a sealing material containing the lead-free glass and the inorganic filler, the sealing material containing the inorganic filler in a range of 1-35 volume % relative to volume of the total of the lead-free glass and the inorganic filler.

By using the inorganic filler, the linear expansion coefficient in 30° C.-250° C. of the sealing material containing the inorganic filler can be $50\text{-}160\times10^{-7}$/K. If the content of the inorganic filler is less than 1 volume %, the effect of reducing the linear expansion coefficient becomes insufficient. In addition, if the content of the inorganic filler exceeds 35 volume %, the fluidity in terms of the sealing material lowers. With this, sealing tends to be insufficient. Moreover, in order to set the linear expansion coefficient at $50\text{-}90\times10^{-7}$/K which is lower than that, more preferably, the content of the inorganic filler can be 10-35 volume %.

As the inorganic filler which is used in the present invention, it is possible to use zirconium phosphate compounds ($(ZrO)_2P_2O_7$, $NaZr_2(PO_4)_3$, $KZr_2(PO_4)_3$, $Ca_{0.5}Zr_2(PO_4)_3$, $NbZr(PO_4)_3$, $Zr_2(WO_4)(PO_4)_2$), zirconium compounds ($ZrSiO_4$, $ZrW_2O_8$), cordierite, β-eucryptite, $SiO_2$, etc. In particular, in case that the purposes are to decrease the linear expansion coefficient and improve the fluidity, it is preferable to use the zirconium phosphate compound or the zirconium compound as the inorganic filler.

One of the preferable embodiments of the present invention is a glass paste containing the glass powder composed of the above-mentioned lead-free glass and an organic vehicle. After kneading the glass powder and an organic vehicle into a paste, the glass paste of the present invention is applied to a predetermined part, and this is baked to seal a desired member.

It is preferable that a solid content (the glass powder+the inorganic filler) is contained 20-80 weight % of the total mass of the glass paste. If it exceeds 80 weight %, the application becomes difficult because viscosity of the glass paste becomes too high. In addition, if it is less than 20 weight %, an airtight sealing becomes difficult due to decreasing the glass component excessively.

The above organic vehicle is composed of an organic solvent and an organic binder. The organic vehicle disappears by combustion, decomposition and volatilization after heating and baking the glass paste.

The above organic binder disperses and keeps the glass powder and the inorganic filler in the glass paste. It is removed from the glass paste by the heat generated by baking the glass paste. In addition, similar to the above organic binder, the organic solvent is not particularly limited if it can be removed from the glass paste at the time of heating.

In addition, one of the preferable embodiments of the present invention is a method of manufacturing electronic components, which is characterized by comprising the step of conducting baking and sealing at a temperature exceeding the softening point after applying the above glass paste. As the above electronic components, for example, a semiconductor package, a crystal unit, a MEMS, etc. are mentioned. They can preferably be used because sealing is possible at 400° C. or lower.

In addition, the present invention can be preferably used for sealing at low temperatures. Therefore, in the above baking step, the baking temperature can be 400° C. or lower. Moreover, the present invention can naturally be used even if the baking temperature exceeds 400° C.

EXAMPLES

In the following, the present invention is specifically explained according to Examples and Comparative Examples.

1: Preparation of a Glass Powder

One (total amount of 50 g), in which a $V_2O_5$ powder, a $TeO_2$ powder, a BaO powder, a CaO powder, a MgO powder, a ZnO powder, a $P_2O_5$ solution (normal phosphoric acid), a $Fe_2O_3$ powder, a NiO powder, a CoO powder and an $Al_2O_3$ powder as raw material oxides had been mixed so as to have ratios (weight %) described in No. 1 to No. 14 of Table 1, was contained in a platinum crucible, and melted at approximately 1100° C. for 30 minutes in an electric furnace. By casting the obtained melted-product onto carbon and crushing it in a mortar, a glass powder was obtained. In addition, it was checked if crystals or non-dissolved materials existed at the time of the above casting. One vitrified with no problem was judged as O, the other was judged as x, and they were described in Tables 1 and 2.

As to the obtained glass powder, softening point, linear expansion coefficient and fluidity were each measured. These results are also shown in Tables 1 and 2. In addition, the measurement method of each item is as follows.

<Linear Expansion Coefficient>

Linear expansion coefficient was measured by a thermomechanical analyzer (TMA8310 made by Rigaku Corporation). In this measurement, linear expansion coefficient α was determined by using one as a measurement sample, in which the glass powder had been melted and formed into a column of 20 mm×5 mmφ (height×diameter) whose upper and bottom surfaces had been formed in parallel, and by increasing the temperature from 30 to 250° C. at 5° C./min. In addition, as a standard sample, quartz glass was used.

<Softening Point>

Softening point was measured by a differential thermal analyzer (TG8120 made by Rigaku Corporation). A second inflection point of DTA curve obtained by heating the glass powder, which had been crushed in a mortar, to increase the temperature at 10° C./min was judged as the softening point.

<Fluidity>

The obtained glass powder was pressed into a column shape of 10 mm high×10 mmφ in diameter by using a hand press machine, and heated at 350° C. for 10 minutes. After heating, it was cooled down to ordinary temperature, followed by measuring diameter of the sample which was cooled down. In an evaluation of fluidity, as compared with the measured diameter before heating, in case that the measured diameter was enlarged 20% or greater (measured diameter of 12 mm or greater), it was judged as ◎, in case that it was enlarged 10% or greater to less than 20% (measured diameter of 11 mm or greater to less than 12 mm), it was judged as O, in case that it was enlarged to less than 10% (less than 11 mm), it was judged as Δ. In addition, regarding some of the glass powders, they were heated at 380° C. for 10 minutes, and their fluidity was evaluated in the same way.

TABLE 1

| wt % | Example |  |  |  |  |  |  |  |  |  |
|---|---|---|---|---|---|---|---|---|---|---|
|  | No. 1 | No. 2 | No. 3 | No. 4 | No. 5 | No. 6 | No. 7 | No. 8 | No. 9 | No. 10 |
| $V_2O_5$ | 13 | 34.7 | 42.7 | 43 | 40 | 42.5 | 44.6 | 39.5 | 39.5 | 39.5 |
| $TeO_2$ | 67 | 44.9 | 44.9 | 38 | 42 | 44.6 | 46.8 | 41.4 | 41.4 | 41.4 |
| BaO | 17 | 15.4 | 9.0 | 18 | 17 | 8.9 |  | 16.6 | 16.6 | 16.6 |
| MgO |  |  |  |  |  | 2.4 |  |  |  |  |
| CaO |  |  |  |  |  |  | 6.9 |  |  |  |
| ZnO | 3 | 5 | 1.6 | 1 | 1 | 1.6 | 1.7 | 1.5 | 1.5 | 1.5 |
| $Li_2O$ |  |  | 1.8 |  |  |  |  |  |  |  |
| $Fe_2O_3$ |  |  |  |  |  |  |  | 1 |  |  |
| NiO |  |  |  |  |  |  |  |  | 1 |  |
| CoO |  |  |  |  |  |  |  |  |  | 1 |
| Vitrification | O | O | O | O | O | O | O | O | O | O |
| Softening point ° C. | 363 | 320 | 300 | 318 | 326 | 330 | 333 | 334 | 337 | 333 |
| Linear expansion coefficient × $10^{-7}$/K | 160 | 140 | 175 | 145 | 155 | 137 | 133 | 146 | 142 | 149 |
| Fluidity 350° C. | — | ◎ | ◎ | ◎ | ◎ | ◎ | O | O | O | O |
| Fluidity 380° C. | ◎ | — | — | — | — | ◎ | ◎ | ◎ | ◎ | ◎ |

TABLE 2

| wt % | Comparative Example |  |  |  |
|---|---|---|---|---|
|  | No. 11 | No. 12 | No. 13 | No. 14 |
| $V_2O_5$ | 72 | 66 | 43.2 | 55.9 |
| $TeO_2$ | 10 | 3 | 29.8 | 39.9 |
| BaO | 16 | 20 | 18 | 2.7 |
| ZnO | 2 | 5 | 7 | 1.5 |
| $Al_2O_3$ |  | 4 |  |  |
| $P_2O_5$ |  | 2 |  |  |
| $Li_2O$ |  |  | 2 |  |
| Vitrification | X | X | O | O |
| Softening point ° C. | — | — | 309 | 289 |

TABLE 2-continued

| wt % | Comparative Example | | | |
|---|---|---|---|---|
| | No. 11 | No. 12 | No. 13 | No. 14 |
| Linear expansion coefficient × $10^{-7}$/K | — | — | 129 | 140 |
| Fluidity 350° C. | — | — | Δ | Δ |
| Fluidity 380° C. | — | — | — | — |

As to the glass powders obtained by the above, each of No. 1 to No. 10 had an excellent fluidity and each of their softening points was lower than 380° C. Therefore, they were useful to be used as a sealing material. On the other hand, No. 11 and 12 were crystallized in a step of casting the melted-product onto the carbon at the time of manufacturing the glass. Therefore, the following evaluations were not performed. In addition, softening points of No. 13 and 14 were low. However, their fluidity was not excellent, and further lowering of the fluidity could be expected if the filler was mixed. Therefore, they were not suitable for the purpose of the present invention.

2: Preparation of a Sealing Material

By using the glass powders (No. 2, 5, 6 and 8) obtained by the above, sealing materials a-f, which were described in Table 3, were prepared, and linear expansion coefficient and fluidity of the sealing materials were measured. As to measurement of the linear expansion coefficient, the inorganic filler and the glass powder were mixed together to have the content in Table 3, and then the glass powder was melted. Similar to when conducting the above-mentioned measurement of the glass power, linear expansion coefficient α was determined by the thermomechanical analyzer by using one formed into a column of 20 mm×5 mmϕ as a measurement sample, and increasing the temperature from 30 to 250° C. at 5° C./min. In addition, as a standard sample, quartz glass was used.

In addition, as to measurement of the fluidity, the inorganic filler and the glass powder were mixed so as to have the content described in Table 3, followed by pressing into a column shape of 20 mmϕ by using a hand press machine, and then heating at 380° C. for 10 minutes. After heating, it was cooled down to ordinary temperature, followed by measuring diameter of the sample which was cooled down. In an evaluation of the fluidity, as compared with the size of the measured diameter before heating, in case that the measured diameter was 90% or greater (measured diameter of 18 mm or greater), it was judged as O, and in case of less than 90% (less than 18 mm), it was judged as Δ.

TABLE 3

| Sealing material | Glass powder No. | Inorganic filler | Content of filler volume % | Linear expansion coefficient × $10^{-7}$/K | Fluidity |
|---|---|---|---|---|---|
| a | 2 | Zirconium phosphate | 24 | 73 | O |
| b | 5 | Zirconium phosphate | 32 | 70 | O |
| c | 6 | Zirconium phosphate | 22 | 77 | O |
| d | 8 | Zirconium phosphate | 24 | 76 | O |
| e | 2 | Zirconium tungsten phosphate | 22 | 80 | O |
| f | 2 | β-eucryptite | 15 | 104 | O |

In a-e in which an inorganic filler of zirconium phosphate or zirconium tungsten phosphate was used, each of them was a sealing material having a linear expansion coefficient of $80×10^{-7}$/K or less and an excellent fluidity. In addition, in b in which No. 5 of the glass powder whose linear expansion coefficient was $150×10^{-7}$/K or greater was used, c in which No. 6 of the glass powder containing MgO as RO component was used and d in which No. 8 of the glass powder containing $Fe_2O_3$ was used, it was found that each of them could be a sealing material having a linear expansion coefficient of $80×10^{-7}$/K or less and an excellent fluidity. Moreover, in f in which β-eucryptite was used, the linear expansion coefficient decreased by the inorganic filler. However, as compared with the case of using zirconium phosphate or zirconium tungsten phosphate, the value of the linear expansion coefficient became higher. Therefore, in case that the linear expansion coefficient of a sealing material is $80×10^{-7}$/K or less, it is preferable to use zirconium phosphate or zirconium tungsten phosphate.

The invention claimed is:

1. A lead-free glass, comprising 5-55 weight % of $V_2O_5$; 38-46.8 weight % of $TeO_2$; 6-20 weight % of a total of RO, wherein RO is at least one selected from the group consisting of MgO, CaO, SrO and BaO; and 0.1-6 weight % of ZnO in a glass component; wherein $V_2O_5+TeO_2+RO+ZnO$ is 70 weight % or greater.

2. The lead-free glass according to claim 1, further comprising 0.1-10 weight % of a total of at least one selected from the group consisting of $Fe_2O_3$, NiO, $Al_2O_3$ and CoO in the glass component.

3. The lead-free glass according to claim 1, wherein a softening point of the lead-free glass is 380° C. or lower.

4. The lead-free glass according to claim 1, comprising at least BaO as RO.

5. A sealing material comprising the lead-free glass according to claim 1 and an inorganic filler, the sealing material comprising the inorganic filler in a range of 1-35 volume % relative to a total volume of the lead-free glass and the inorganic filler.

6. The sealing material according to claim 5, that wherein the inorganic filler is zirconium phosphate or zirconium tungsten phosphate.

7. A glass paste, comprising a glass powder composed of the lead-free glass according to claim 1 and an organic vehicle.

8. A method of manufacturing an electronic component, comprising the step of conducting baking and sealing at a temperature exceeding a softening point after applying the glass paste according to claim 7.

9. The method of manufacturing the electronic component according to claim 8, wherein the baking temperature is 400° C. or lower in the baking step.

10. The lead-free glass according to claim 1, wherein $V_2O_5+TeO_2+RO+ZnO+R_2O+Fe_2O_3+NiO+Al_2O_3+CoO+ZrO_2$ are 100 weight %.

* * * * *